United States Patent [19]
Goodman et al.

[11] 3,740,124
[45] June 19, 1973

[54] FLOATABLE SPECTACLES

[75] Inventors: Abraham Goodman, Essex Fells, N.J.; Conrad Leblanc, Leominster, Mass.

[73] Assignee: Foster Grant Co., Inc., Leominster, Mass.

[22] Filed: Sept. 7, 1971

[21] Appl. No.: 177,976

[52] U.S. Cl. .................................................. 351/43
[51] Int. Cl. ............................................. G02c 1/00
[58] Field of Search ........................................ 351/43

[56] References Cited
UNITED STATES PATENTS
3,517,989  6/1970  Wilson.................................. 351/43
FOREIGN PATENTS OR APPLICATIONS
829,813  1/1952  Germany ............................. 351/43

Primary Examiner—Ronald L. Wibert
Assistant Examiner—Paul A. Sacker
Attorney—Leroy G. Sinn, Coleman R. Reap and Leonard S. Selman

[57] ABSTRACT

A floatable pair of spectacles having an over-all specific gravity of less than 1 while being formed of solid material, the total amount of which included in all portions of said spectacles having an average specific gravity of at least 1. Compartments within the frame of the spectacles define a volume of not less than about 25 percent of the over-all volume of the frame. Novel hinge support mounting portions and frame joints are used in conjunction with novel parameter selection to obtain flotation in water in a lightweight, inexpensive, mechanically strong and esthetically pleasing form.

14 Claims, 8 Drawing Figures

PATENTED JUN 19 1973
3,740,124
SHEET 1 OF 2

INVENTORS
ABRAHAM GOODMAN
CONRAD LEBLANC

INVENTORS
ABRAHAM GOODMAN
CONRAD LEBLANC

FLOATABLE SPECTACLES

BACKGROUND OF THE INVENTION

Various types of floatable spectacles are known in the art. For example, U.S. Pat. No. 3,517,989 discloses a highly successful floatable spectacle which utilizes a plastic frame with the material of the frame being selected to have a specific gravity below that of water to allow flotation. Such devices while extremely useful, are sometimes limited to particular materials having required specific gravities which sometimes limits coloring effects obtainable.

German Pat. No. 829,813 describes other types of floatable spectacles including a frame provided with hollow air spaces. Apparently such air space frames have not come into widespread usage due to difficulties in design, manufacture and watertight integrity of air spaces so formed.

SUMMARY OF THE INVENTION

It is an important object of this invention to provide a pair of spectacles which have sufficient buoyancy to float in water.

Another object of this invention is to provide a pair of spectacles in accordance with the preceding object which overcome limitations and deficiencies of the prior art and are light in weight, mechanically strong, non-irritating and esthetically pleasing.

Still another object of this invention is to provide floatable spectacles which can be made of conventional molding materials using conventional molding methods and apparatus with minimized expense.

According to the invention, a floatable pair of spectacles include lenses and frame having an over-all specific gravity of less than 1, but being formed of solid material the total amount of which included in all portions of said spectacles having an average specific gravity of at least 1. The frame has walls defining smooth outer surfaces unimpaired by non-esthetic and irritation producing seam joint lines. The frame defines enclosed, sealed compartments which are dimensioned to provide the desired over-all specific gravity, preferably in accordance with a pre-determined formula. The frame walls have a minimum thickness of 0.015 inch and preferably a minimum thickness of 0.040 inch. The compartments define a volume of not less than about 25 percent of the over-all volume of the frame.

In the preferred embodiment, the material of the frame is an organic plastic and has a specific gravity below 1.5. Hinges are provided to join the front and temple members together with the hinges mounted on solid cross section portions of the frame.

In the preferred embodiment, each member forming the frame is formed of multiple parts. The parts are joined together at a joint defining a smooth uninterrupted seam line. Each of the parts have mating surfaces comprising said joint with portions of the surfaces spaced from the seam line being adhesively secured together in a watertight seal. This joint structure overcomes unsightly ridges or depressions at the seam line enabling an esthetically pleasing device to be formed which does not have projections capable of causing irritation to the head of a wearer.

It is an important feature of this invention that hinges used are mounted on solid cross sections of the frame. Such mountings prevent entrance of water to the compartments even when the spectacles are subjected to rough usage, dropping and normal handling which could cause water integrity problems if the compartments were not entirely sealed within the solid material of the frame.

Another important feature is the ability to use a large variety of frame materials in practicing the invention. Thus, plastics which are clear, translucent, colored and/or paint receptive can be used even if such plastics have high specific gravity.

BRIEF DESCRIPTION OF THE DRAWINGS

The above and other objects, features and advantages of the present invention are more fully described in the following specification to be read in conjunction with the accompanying drawings in which.

DESCRIPTION OF PREFERRED EMBODIMENTS

Figure 1:
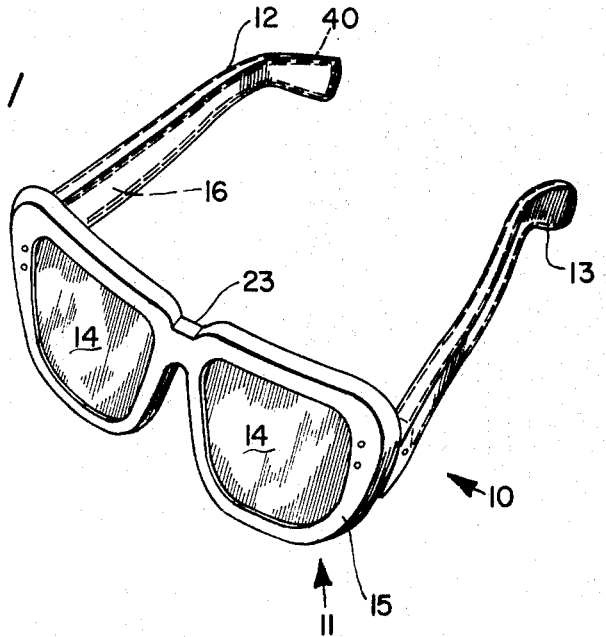
FIG. 1 is a perspective view of a pair of spectacles in accordance with a preferred embodiment of this invention.
Figure 2:
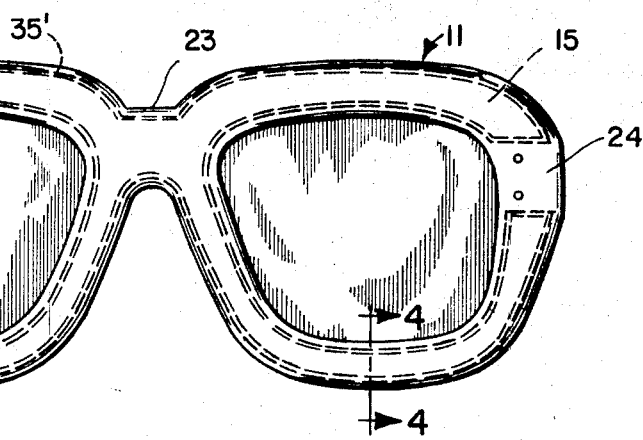
FIG. 2 is a front plan view thereof.
Figure 3:
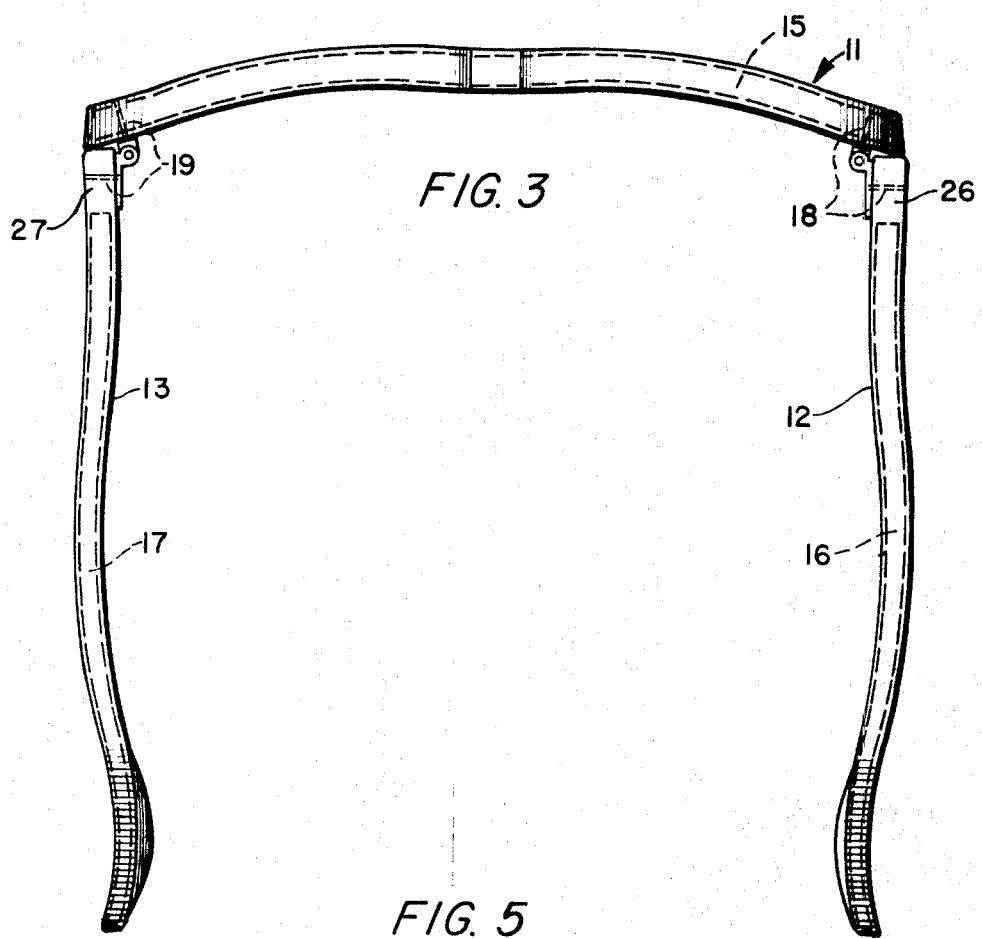
FIG. 3 is a top view thereof.

With reference now to the drawings and more particularly FIGS. 1–3, a preferred embodiment of this invention is illustrated generally at 10 and comprises a hollow, front frame member 11, with right and left hollow temple members 12, 13 hinged to the front piece. The front frame member 11 carries conventional lenses 14. Each of the members 11, 12 and 13 have a substantially centrally located air compartment 15, 16 and 17, respectively, for providing sufficient buoyancy to float the spectacles 10 in water.

Figure 7:
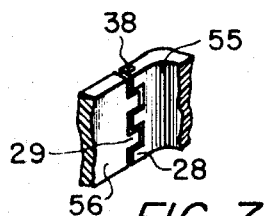
FIG. 7 is a fragmentary view of integrally molded hinge structure for the pair of spectacles.

The front frame member 11 as shown in FIGS. 1 and 2 has a standard front frame member shape defining lens holding portions integrally connected together by a bridge piece 23. In the preferred embodiment, the cross section of compartment 15 conforms in shape to and is slightly smaller than the cross section of the front member. The compartment 15 is interrupted at ends of the front member, by solid cross section mounting portions 24 and 25 to which temple hinges 18 and 19 respectively are attached. The hinges are preferably conventional metallic hinges attached to the front frame member and temple members by conventional pins 18 and 19 passing through the cross sections thereof. Since the pins do not pass through any compartments, there is no chance that usage will loosen the pins in such a manner as to cause leaking of water into the compartments. Screws and other conventional hinge mounting hardware can be used in place of the pins as known in the art. The hinges are attached to the temples at solid cross section mounting portions 26 and 27. The hinges may also be substantially of plastic material molded integrally with the frame and having interengaging leaves 28 and 29 formed on each side of the front member 11 and each temple 12 and 13 as shown in FIG. 7. A metal or plastic pin 38 serves to join the leaf members and serves as a hinge axis. The leaves 28 and 29 are formed of solid plastic material and extend from solid cross section hinge mounting portions 55 and 56 also for added strength.

Figure 4:
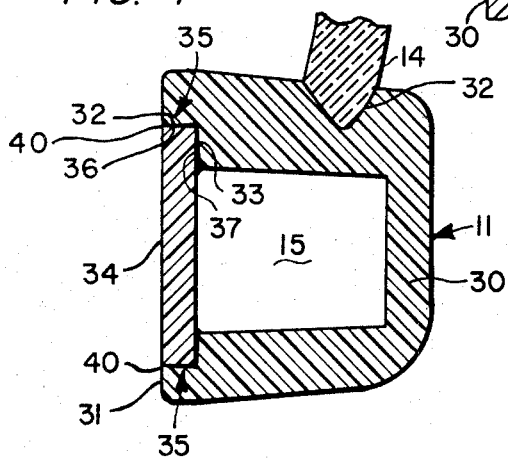
FIG. 4 is a cross sectional view thereof taken through line 4—4 of FIG. 2.

Preferably each member of the frame is formed of two injection molded parts joined together at a continuous seam line. Since the structure and joinery are substantially identical in each frame member, only the cross section of the front frame member is illustrated in detail in FIG. 4.

The front frame member 11 is formed of an injection molded plastic wall 30 having a generally C shape and defining a smooth outer surface 31 with a continuous lens groove 32 for mounting a lens 14. An open side of the wall 30 has L-shaped step means 35 defining a rebated set of joining, continuous, planar surfaces 32 and 33 in which is affixed a second molded plastic part 34 of the frame front member 11. The part 34 is a flat plate dimensioned as shown by dotted line 35' of FIG. 2 to fit within the rebated mouth opening of C-shaped wall 30. Thus, part 34 has a first joining surface 36 mating with surface 32 and a second joining surface 37 mating with joining surface 33. When assembled, the two parts of the front frame member define the compartment 15 which is a trapped air space sealed with a watertight seal. As can be seen the L-shaped step means 35 serves to locate the parts of the joint with respect to one another during joining thereof and provide the continuous joining surfaces on each of the parts for effecting the adhesively secured watertight seal.

The wall thickness of the two parts of the front frame member can vary greatly depending upon the particular spectacle design. A minimum wall thickness of at least 0.015 inch and preferably of at least about 0.040 inch is used to maximize mechanical strength and minimize over-all weight. The walls of the two parts of each frame member are formed of solid materials which are preferably organic plastics but can be of other materials. Suitable organic plastics include but are not limited to acetate, propionate, nylon, butyrate, polycarbonate, and the like. Such plastics normally have specific gravities of at least 1 and would not float in water but for the fact that trapped air spaces or compartments are used. Ordinarily all of the solid material used in forming the front frame portions, lenses and temple members will have specific gravities of at least 1 but it is also recognized that any of these elements could be made of a material having a specific gravity slightly less than 1. For example, the temple members 12 and 13 could be formed of solid polypropylene having a specific gravity of 0.90, while the lenses are of glass having a specific gravity of approximately 2.53 and the front frame member 11 is of acetate having a specific gravity of 1.32. Due to the volume of solid material in the lenses and front frame member with these higher specific gravities being proportionally greater than the volume of the solid material in the temple members the average specific gravity of all portions of the spectacles is still at least 1 and the spectacles would sink in water except for air chambers provided in the front frame member in accordance with the present invention. It is preferred to use organic plastic materials for the frame which have specific gravities below 1.5 in order to avoid unduly bulky frames which could result from the large volume of the compartments necessary to float heavier materials. If metal is used for the frames, thinner frame walls are possible using certain known fabrication techniques and material having a specific gravity below 10.5 may be utilized.

The lenses 14 can be any conventional eyeglass or sunglass lenses such as lenses made of glass, clear plastics and the like known to the art.

In the preferred embodiment 10, a smooth, substantially uninterrupted seam line 40 is formed which does not have any outward projections from the outer surface 31. This is accomplished by the use of solvent or other sealing at the mating surfaces 33–37. Thus, when a solvent is applied to surface 33, and the parts brought together, although some of the solvent may pass upwardly between mating surfaces 32 and 36, careful application avoids solvent sealing at the seam line 40 itself. Thus, the seam line is substantially invisible particularly when colored plastics are used or paint is applied to the outer surface of the members.

While a specific cross section of the front frame member 11 has been described, it should be understood that the cross section and joint construction used in temple members 12 and 13 are identical except that the lens groove is eliminated.

Although the cross section of the walls of the frame members can vary greatly to obtain desired frame designs, the total volume of the compartments within the frame define a volume of not less than about 25 percent over-all volume of the frame.

The specific dimensions of spectacles made in accordance with this invention can vary greatly as can the parameters for compartment size and the like. However, in all cases, the properties of the components of the spectacles should be in accordance with the following expression:

$$(V_1 - V_A)(SG_1) + V_2(SG_2) + V_3(SG_3) < (V_1+V_2+V_3)SG_w$$

where
$V_1$ is the displacement of the front frame members and temple members,
$V_A$ is the volume of the compartments of the frame,
$SG_1$ is the specific gravity of the material from which the front frame members and temple members are made,
$V_2$ is the displacement of the lenses;
$SG_2$ is the specific gravity of the material from which the lenses are made,
$V_3$ is the displacement of the hinge parts,
$SG_3$ is the specific gravity of the material from which the hinge parts are made,
$SG_w$ is the specific gravity of water, or 1.0.

It is found that if the above expression is followed in designing spectacles in accordance with this invention, flotation can easily be achieved.

Two specific, nonlimiting examples illustrating the invention are as follows.

Example 1

Spectacles according to this invention as shown in FIG. 1 are constructed with two-part injection molded solid acetate frame members having glass lenses. The following parameters are used:

$V_1 = 3.0$ cu. in.
$V_A = 1.75$ cu. in.
$SG_1 = 1.32$
$V_2 = 0.65$ cu. in.
$SG_2 = 2.53$
$V_3 = 0.03$ cu. in.

$SG_3 = 8.80$

Using the expression $(V_1 - V_A)SG_1 + V_2(SG_2) + V_3(SG_3) < (V_1+V_2+V_3)SG_w$ $(3 - 1.8) 1.32 + 0.65(2.53) + 0.03 (8.80) < (3 + 0.65 + 0.03) 1$ $1.58 + 1.65 + 0.264 < (3 + 0.65 + 0.03) 1$ $3.49 < 3.68$ Since 3.49 is less than 3.68, the spectacles will float in water.

Example II

Spectacles according to this invention as shown in FIG. 1 are constructed with two-part injection molded solid acetate butyrate frame members with plastic lenses formed of CR-39. The following parameters are used:

$V_1 = 2.5$ cu. in.
$V_A = 1.0$ cu. in.
$SG_1 = 1.22$
$V_2 = 0.65$ cu. in.
$SG_2 = 1.35$
$V_3 = 0.03$ cu. in.
$SG_3 = 8.80$

Using the expression:

$(V_1 - V_A) SG_1 + V_2 (SG_2) + V_3 (SG_3) < (V_1 + V_2 + V_3) SG_w$ $(2.5-1.0) 1.22 + 0.65 \times 1.35 + 0.03 (8.80) < (2.5 + 0.65 + 0.03) 1$ $1.83 + 0.88 + 0.26 < 2.5 + 0.65 + 0.03$ $2.97 < 3.18$ Since 2.97 is less than 3.18, the spectacles will float in water.

Figures 5, 5A, 6:
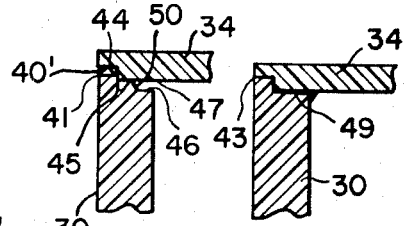
FIG. 5 and 5A illustrate steps in an alternate embodiment of a joint construction of this invention.
FIG. 6 is a cross sectional view illustrating another alternate embodiment of a joint construction useful in this invention.

In alternate embodiments of this invention, the joint structure can vary so long as a watertight seal is formed for the air space compartments and preferably a simulated seamless construction is formed which is non-irritating and esthetically pleasing. In one specific alternate embodiment of a joint structure as shown in FIGS. 5 and 5A, ultrasonic welding is used to join the two parts 30, 34 of the frame member 11. In this embodiment, first mating surfaces 40' and 41 extend from the seam line 43 with second mating surfaces 44 and 45 extending therefrom to third mating and joining surfaces 46, 47. The two parts of a member such as 30 and 34 are shown in their assembled sealed relationship with a watertight seal formed at 49 and a simulated seamless seal line 43 at an outer surface of the member. Preferably an energy director ridge 50, as known in the ultrasonic welding art, is used continuously about surface 46 thereby causing the seal 49 to form with minimum disruption of material at the joining surfaces 40' and 41. Conventional ultrasonic welding techniques can be used.

In another alternate embodiment of the invention, the joint structure takes the configuration shown in cross section in FIG. 6 between two member parts indicated at 51 and 52. An energy director ride 53 causes the sealing and watertight relationship as above described with a seam line formed at 54. Note that the joints shown in FIGS. 5, 5A and 6 also include L-shaped step means which provide the aforementioned locating and joining functions.

Various joining methods and configurations can be used in addition to those specifically described although it is preferred that the joining surfaces directly adjacent the seam line be disturbed as little as possible. Such joining methods are referred to herein as "adhesive" joining methods and include the use of solvents, adhesives, ultrasonic welding and watertight fusing steps of all types.

While specific embodiments of the present invention have been shown and described, many modifications are possible. The shape of the frame members and lenses can vary greatly as known in the art. Metal, plastic or integral hinges can be used so long as they extend from the frame at solid cross section mounting sections. In some cases, additional strength can be provided by filling the compartments with materials having specific gravities less than 1. While it is preferred to provide a single continuous compartment in each member of the frame, plural compartments in each member can be used. For example, if it is desired to reinforce the bridge portion 23 it can have a solid cross section, so long as the overall compartment volume is in accordance with that necessary to provide adequate flotation. In some cases, a single member of the frame can be compartmented to provide sufficient buoyancy while using some wholly solid cross section members.

While it is preferred to use two-part frame members, particularly where plural compartments are used in each member, more than two parts can be joined together to form each frame member. For example, front frame member 11 can be formed with a solid cross section bridge piece 23. In this case, integral part 34 is not used but instead two parts corresponding in shape to the generally C-shaped portions of part 34 are used to form two separate air compartments in the front frame member.

In still another modification, the frame members need not be made of injection molded parts. For example, compartments can be provided by blow molding techniques to form the desired compartments with suitably dimensioned solid cross section hinge mounting sections and with the over-all compartment volume and frame parameters used conforming to the parameter selection expression in accordance with this invention.

We claim:

1. A floatable pair of spectacles including lens and frame, said pair of spectacles having an over-all specific gravity of less than 1 but being formed of solid material, the total amount of which included in all portions of said spectacles having an average specific gravity of at least 1, Said frame having frame walls defining at least one enclosed, sealed compartment which is dimensioned to provide said over-all specific gravity of less than 1, said frame comprising a front frame member and first and second temple members, at least one of said members being formed of molded plastic material, said one member having multiple parts defining at least one of said frame compartments, two of said parts being joined together so as to provide a smooth uninterrupted seam line defining the visible outside unsealed portion of a joint including complimentary mating surfaces with portions of said mating surfaces which are spaced from said seam line being adhesively secured together in a watertight seal, said frame walls having a minimum thickness of 0.015 inch, and said at least one compartment defining a volume of not less than about 25 percent of the over-all volume of said frame.

2. A floatable pair of spectacles in accordance with claim 1 wherein the properties of the components of the pair of spectacles are in accordance with the following expression:

$$(V_1 - V_A)(SG_1) + V_2(SG_2) + V_3(SG_3) < (V_1+V_2+V_3) SG_w$$

where $V_1$ is the displacement of the front frame member and temple members, $V_A$ is the volume of the compartments of the frame, $SG_1$ is the specific gravity of the material from which the front frame member and temple members are made, $V_2$ is the displacement of the lenses, $SG_2$ is the specific gravity of the material from which the lenses are made, $V_3$ is the displacement of the hinge parts, $SG_3$ is the specific gravity of the material from which the hinge parts are made, $SG_w$ is the specific gravity of water, or 1.0.

3. A floatable pair of spectacles in accordance with claim 1 wherein said frame material is of organic plastic material which has a specific gravity below 1.5.

4. A floatable pair of spectacles in accordance with claim 1 wherein said frame material is of metal and has a specific gravity below 10.5.

5. A floatable pair of spectacles in accordance with claim 1 wherein said frame comprises:
a pair of hinges,
solid cross section hinge mounting portions, and
said hinges being mounted on said portions.

6. A floatable pair of spectacles in accordance with claim 1 wherein said complimentary mating surfaces on each of said parts have such a configuration that there is a distinct continuous joining surface for effecting the adhesively secured watertight seal on each of the parts spaced from the visible seam line by another distinct portion of the joint of differing orientation with respect to said seam line than said sealed joining surfaces.

7. A floatable pair of spectacles in accordance with claim 6 wherein the configuration of said mating surfaces comprise L-shaped step means formed in one of said parts which receives a complimentary mating portion of the other of said parts, said step means serving to locate the parts with respect to one another during joining thereof and providing said distinct continuous joining surface on each of said parts for effecting the adhesively secured watertight seal.

8. A floatable pair of spectacles in accordance with claim 1 wherein said frame further comprises a pair of hinges with each hinge joining said front member to one of said temple members,
said front member and each of said temple members having solid cross section hinge mounting portions, and said hinges being mounted on said portions.

9. A floatable pair of spectacles in accordance with claim 8 wherein said pair of hinges comprise integrally molded plastic leaves on each of said frame and temple members extending from said solid cross section hinge mounting portions.

10. A floatable pair of spectacles in accordance with claim 8 wherein the properties of the components of the pair of spectacles are in accordance with the following expression:

$$(V_1 - V_A)(SG_1) + V_2(SG_2) + V_3(SG_3)(V_1+V_2+V_3) SG_w$$

where $V_1$ is the displacement of the front frame member and temple members, $V_A$ is the volume of the compartments of the frame, $SG_1$ is the specific gravity of the material from which the front frame member and temple members are made, $V_2$ is the displacement of the lenses, $SG_2$ is the specific gravity of the material from which the lenses are made, $V_3$ is the displacement of the hinge parts, $SG_3$ is the specific gravity of the material from which the hinge parts are made, $SG_w$ is the specific gravity of water, or 1.0.

11. A floatable pair of spectacles in accordance with claim 10 wherein said plastic material is a clear, transparent plastic.

12. A floatable pair of spectacles in accordance with claim 1 wherein said second mating joining surfaces define an energy director ridge therebetween and said multiple parts are ultrasonically welded to form said watertight seal.

13. A floatable pair of spectacles in accordance with claim 1 wherein each of said members is formed of a molded plastic material and each of said members have multiple parts defining a frame compartment.

14. A floatable pair of spectacles in accordance with claim 13 wherein said front member comprises an integral bridge piece.

* * * * *